(12) United States Patent
Chen et al.

(10) Patent No.: US 11,569,907 B2
(45) Date of Patent: Jan. 31, 2023

(54) PER-BAND FAULT SIGNALING IN A MULTI-BAND OPTICAL TRANSMISSION SYSTEM

(71) Applicant: Ciena Corporation, Hanover, MD (US)

(72) Inventors: Edward Chen, Kanata (CA); Choudhury A. Al Sayeed, Stittsville (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/002,835

(22) Filed: Aug. 26, 2020

(65) Prior Publication Data

US 2022/0069903 A1  Mar. 3, 2022

(51) Int. Cl.

| | | |
|---|---|---|
| *H04B 10/079* | (2013.01) | |
| *H04B 10/077* | (2013.01) | |
| *H04B 10/03* | (2013.01) | |
| *H04J 14/02* | (2006.01) | |
| *H04B 10/296* | (2013.01) | |
| *H04B 10/516* | (2013.01) | |
| *H04B 10/293* | (2013.01) | |

(52) U.S. Cl.
CPC ......... *H04B 10/0771* (2013.01); *H04B 10/03* (2013.01); *H04B 10/0795* (2013.01); *H04B 10/293* (2013.01); *H04B 10/296* (2013.01); *H04B 10/5165* (2013.01); *H04J 14/0221* (2013.01); *H04J 14/0267* (2013.01)

(58) Field of Classification Search
CPC ............................................ H04B 10/03–0799
USPC ...................... 398/1–38, 177, 181
See application file for complete search history.

(56) References Cited

U.S. PATENT DOCUMENTS

| | | | | |
|---|---|---|---|---|
| 5,719,697 | A * | 2/1998 | Pedersen ............. | H04B 10/291 359/341.43 |
| 5,914,794 | A * | 6/1999 | Fee .................... | H04B 10/0775 398/20 |
| 6,075,629 | A * | 6/2000 | Al-Salameh ......... | H04B 10/032 398/1 |
| 6,292,289 | B1 * | 9/2001 | Sugaya .............. | H04B 10/0775 359/337 |
| 6,321,004 | B1 * | 11/2001 | Duerksen ............ | H04B 10/032 385/24 |
| 7,046,929 | B1 * | 5/2006 | Hester ................ | H04B 10/0771 398/1 |
| 7,590,350 | B2 * | 9/2009 | Moffatt .............. | H04J 14/0227 398/25 |

(Continued)

*Primary Examiner* — Li Liu (74) *Attorney, Agent, or Firm* — Clements Bernard Baratta; Lawrence A. Baratta, Jr.; Christopher L. Bernard (57) ABSTRACT

Systems, methods, and computer-readable media are provided for signaling the presence of a fault in a multi-band optical network or other communication system. In response to a detected fault in a multi-band communication system impacting a specific band of the multi-band communication system, a method, according to one implementation, may include a step of creating a fault signal corresponding to the detected fault. The method may also include the step of conveying the fault signal to at least one of an upstream controller and a downstream controller of the multi-band communication system to trigger an action for handling the fault on the specific band. The action may be handled independently of other actions associated with one or more other bands of the multi-band communication system.

20 Claims, 6 Drawing Sheets

(56) References Cited

U.S. PATENT DOCUMENTS

| | | | |
|---|---|---|---|
| 8,055,127 B2 * | 11/2011 | Magri | H04B 10/27 398/18 |
| 8,509,621 B2 | 8/2013 | Boertjes et al. | |
| 9,344,191 B2 | 5/2016 | Al Sayeed et al. | |
| 9,485,013 B2 * | 11/2016 | Al Sayeed | H04B 10/0777 |
| 9,577,763 B2 | 2/2017 | Al Sayeed et al. | |
| 9,768,902 B2 | 9/2017 | Al Sayeed et al. | |
| 9,806,803 B2 | 10/2017 | Bownass et al. | |
| 9,882,634 B1 | 1/2018 | Al Sayeed et al. | |
| 9,906,294 B2 | 2/2018 | Al Sayeed et al. | |
| 9,918,148 B2 | 3/2018 | Swinkels et al. | |
| 9,973,295 B2 | 5/2018 | Al Sayeed et al. | |
| 9,985,726 B1 * | 5/2018 | Al Sayeed | H04B 10/0791 |
| 9,986,317 B1 | 5/2018 | Al Sayeed et al. | |
| 10,063,313 B1 * | 8/2018 | Al Sayeed | H04J 14/029 |
| 10,237,011 B2 | 3/2019 | Al Sayeed et al. | |
| 10,439,709 B1 | 10/2019 | Al Sayeed | |
| 10,455,300 B2 | 10/2019 | Swinkels et al. | |
| 10,536,235 B2 | 1/2020 | Al Sayeed et al. | |
| 10,547,404 B1 | 1/2020 | Al Sayeed et al. | |
| 10,560,212 B2 | 2/2020 | Al Sayeed et al. | |
| 10,587,339 B1 | 3/2020 | Al Sayeed et al. | |
| 10,680,737 B1 | 6/2020 | Al Sayeed et al. | |
| 10,686,543 B1 | 6/2020 | Al Sayeed et al. | |
| 2002/0181037 A1 * | 12/2002 | Lauder | H04J 14/0227 398/3 |
| 2004/0170433 A1 * | 9/2004 | Caprino | H04B 10/296 398/83 |
| 2005/0105902 A1 * | 5/2005 | Alavie | H04B 10/077 398/34 |
| 2013/0058647 A1 * | 3/2013 | Boertjes | H04B 10/0775 398/38 |
| 2017/0230110 A1 * | 8/2017 | Hurley | H04J 14/021 |
| 2017/0339028 A1 * | 11/2017 | Holness | G06F 11/3409 |
| 2018/0234749 A1 * | 8/2018 | Chedore | H04J 14/0212 |
| 2019/0097727 A1 * | 3/2019 | Mikami | H04B 10/297 |
| 2019/0103939 A1 * | 4/2019 | Al Sayeed | H04J 14/0287 |
| 2019/0253361 A1 | 8/2019 | Mackay et al. | |
| 2019/0349262 A1 | 11/2019 | Miedema et al. | |
| 2020/0059315 A1 | 2/2020 | Al Sayeed et al. | |
| 2020/0076499 A1 | 3/2020 | Al Sayeed et al. | |
| 2020/0112365 A1 * | 4/2020 | Satbhaiya | H04J 14/0287 |
| 2020/0153502 A1 * | 5/2020 | Buset | H04B 10/03 |
| 2020/0304204 A1 * | 9/2020 | Syed | H04B 10/07955 |

\* cited by examiner

PER-BAND FAULT SIGNALING IN A MULTI-BAND OPTICAL TRANSMISSION SYSTEM

TECHNICAL FIELD

The present disclosure generally relates to multi-band optical networking systems and methods. More particularly, the present disclosure relates to signaling faults that impact one specific band of a multi-band optical transmission system where the signaling and handling of the faults is conducted independently of other bands in the multi-band optical transmission system.

BACKGROUND

In a communications system, such as an optical transmission network, it is generally necessary to detect when a fault occurs such that certain actions can be taken to recover the system to a normal operating condition. In a conventional optical transmission system, detected faults are usually viewed as problematic for an entire section or line of the network. Thus, when a fault is detected, actions are taken to avoid or correct the problematic section or line altogether.

Conventional systems can handle these line-faults, which may include a) line fiber cuts that impact all spectrum bands, b) any amplifier or line-facing optical component failure or circuit pack removal, or others. For either of these types of faults, conventional systems normally treat them as an Optical Multiplex Section (OMS) level fault. The node detecting the fault may generate an OMS Forward Defect Indication (OMS-FDI) or may generate an OMS Reverse Defect Indication (OMS-RDI) for the entire OMS. The OMS-FDI may be used to notify a downstream OMS of this upstream section fault so that a downstream multiplexer can take necessary actions. The OMS-FDI can work as a digital notification so that the downstream multiplexer can trigger an Amplified Spontaneous Emission (ASE) replacement in an ASE loaded system. The OMS-RDI can be used to notify a local section head about the section fault condition so that local section head can freeze all of its control actions until the faulted line system is recovered.

In a Layer 0 Control Plane (L0CP) (e.g., optical line), if a line fault is detected and either an OMS-FDI or OMS-RDI is raised, a controller in the control plane may be configured to restore all channels of the line system on another path. In some cases, the controller in the control plane may be configured to avoid the link for further restoration.

Although these techniques may be helpful in many situations, the conventional systems may not be optimized to perform restoration and/or link avoidance on a finer scale to only conduct actions where they are needed. For instance, in a multi-band optical system (e.g., C-band plus L-band), the conventional systems may have certain shortcomings. Since conventional systems do not handle band-specific failure conditions (i.e., a fault that is specific to one band), there is a need in the field of multi-band optical networking systems to handle faults per band. Instead of this, conventional systems might trigger a Layer 0 (L0) restoration on all transmission bands and/or may trigger an ASE replacement for all transmission bands in a downstream section multiplexer.

In addition, for a Raman amplified ASE loaded system, the ASE replacement mechanism may be considered as the core feature and may rely on a Loss of Signal (LOS) detection on a channel. However, the ASE replacement mechanism may fail in a multi-band transmission system due to additional Stimulated Raman Scattering (SRS) and tilt generated in the system on a band-specific or common-line failure. In either case, the existing methods fail to resolve the condition. Again, there is therefore a need for systems capable of handling faults on a per band basis.

BRIEF SUMMARY

The present disclosure is directed to systems and methods for handling faults that occur in a multi-band network, such as an optical network. For example, a multi-band optical communication system may include communication of optical signals in the C-band and L-band, or, according to other embodiments, may include operation within any spectrum covering a plurality of bands. If it determined that a fault impacts a single band of the multi-band network, fault signaling may be provided to upstream or downstream controllers via a control plane for handling the fault with respect to that particular band only, regardless of any controller on the other bands.

According to one embodiment, a controller of a multi-band communication system is provided. The controller may include a processing device and a memory device configured to store computer logic having instructions. The instructions, when executed, may be configured to enable the processing device to create a fault signal corresponding to the detected fault in response to a detected fault in the multi-band communication system impacting a specific band of the multi-band communication system. The instructions may further enable the processing device to convey the fault signal to at least one of an upstream controller and a downstream controller of the multi-band communication system to trigger an action for handling the fault on the specific band. The action may be handled independently of other actions associated with one or more other bands of the multi-band communication system.

According to another embodiment, a non-transitory computer-readable medium configured to store a computer program is provided. The computer program may include instructions that, when executed, enable one or more processing devices to perform certain functions. In response to a detected fault in the multi-band communication system impacting a specific band of the multi-band communication system, the instructions may cause the one or more processing devices to create a fault signal corresponding to the detected fault. Then, the one or more processing devices may convey the fault signal via a control plane to one or more of an upstream controller and a downstream controller of the multi-band communication system to trigger an action for handling the fault on the specific band, wherein the action is handled independently of other actions associated with one or more other bands of the multi-band communication system.

According to yet another embodiment, a method is provided. In response to a detected fault in a multi-band communication system impacting a specific band of the multi-band communication system, the method may include the step of creating a fault signal corresponding to the detected fault. Also, the method may include the step of conveying the fault signal at least one of an upstream controller and a downstream controller of the multi-band communication system to trigger an action for handling the detected fault on the specific band, wherein the action is handled independently of other actions associated with one or more other bands of the multi-band communication system.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

The present disclosure describes systems and methods associated with a communication system, such as an optical transmission networking system. More particularly, the optical systems of the present disclosure may include multiple bands, such as C+L band systems, where a C-band is configured to include spectrum between about 1530 nm and 1565 nm and where an L-band is configured to include spectrum between about 1565 nm and 1625 nm. Thus, as described herein, a multi-band system may include two or more wavelength bands. While the present disclosure references the C-band and the L-band, other bands are also contemplated.

When a fault is detected in the multi-band optical network of the present disclosure, the detected fault may be treated differently than the way in which faults are handled in conventional systems. For example, instead of treating an entire line or entire section as one entity, as is normally done in conventional systems, the embodiments of the present disclosure are configured to handle faults, whereby actions executed to correct or restore a fault with respect to an in-band component in the one band may be completed independently of actions that are taken with the one or more other bands. Therefore, the present embodiments are configured to handle faults on a "per band" basis. Instead of triggering a Layer 0 (L0) restoration on all transmission bands and/or triggering an ASE replacement for all transmission bands in a downstream section multiplexer, the embodiments of the present disclosure are configured to handle the faults per band, independently of the other band or bands.

Optical Network

Figure 1:
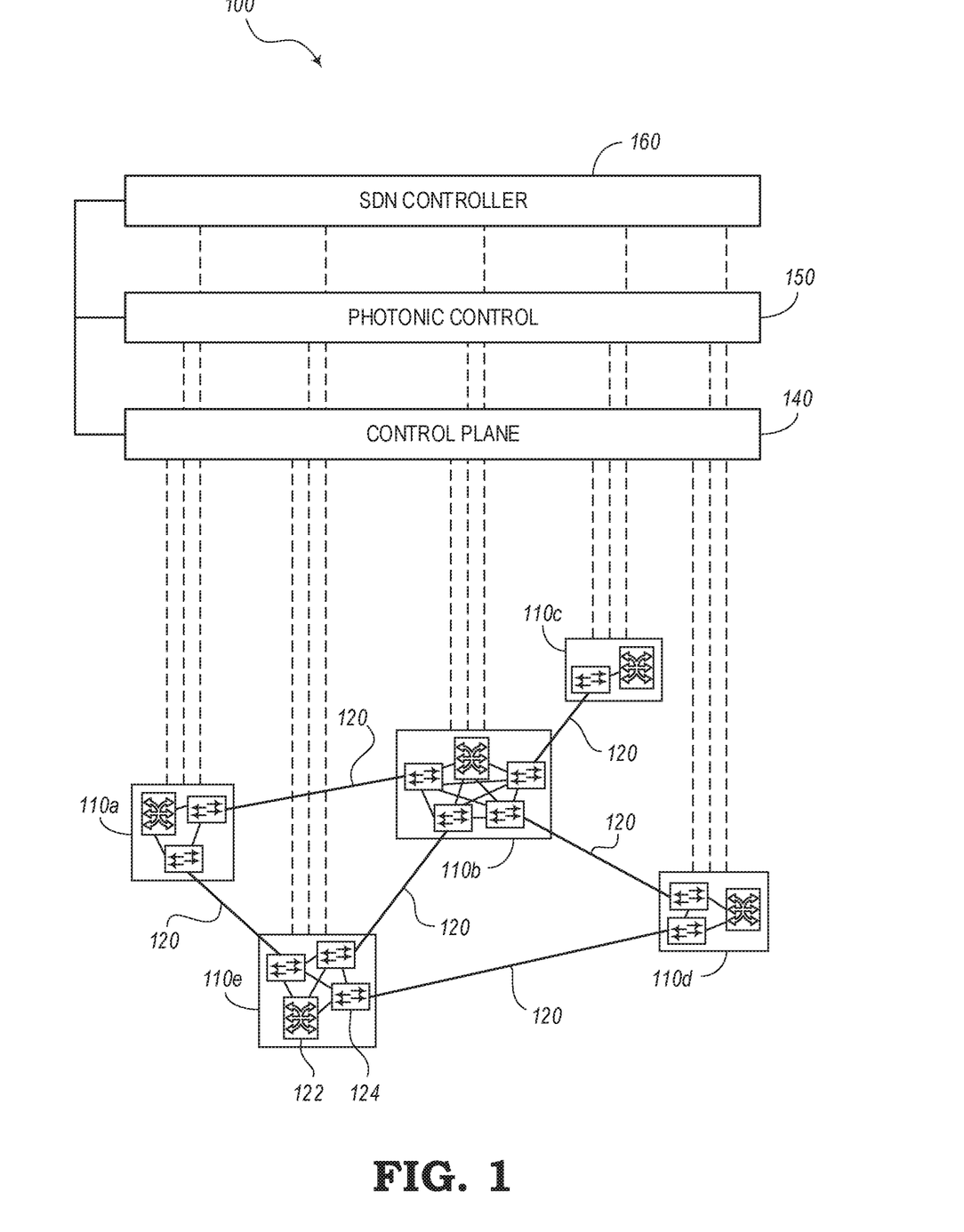
FIG. 1 is a diagram showing an embodiment of a network with five interconnected sites.

FIG. 1 is a diagram showing an embodiment of a network 100 with five interconnected sites 110a, 110b, 110c, 110d, 110e. The sites 110, or nodes, are interconnected through a plurality of links 120. Each of the sites 110 can include a switch 122 and one or more Wavelength Division Multiplexing (WDM) network elements 124. The switch 122 is configured to provide services at Layers 1 (e.g., OTN, SONET, SDH, etc.) and/or Layer 2 (e.g., Ethernet). The WDM network elements 124 provide the photonic layer (e.g., Layer 0) and various functionality associated therewith (e.g., multiplexing, amplification, optical routing, wavelength conversion/regeneration, local add/drop, etc.) including photonic control. Of note, while shown separately, those of ordinary skill in the art may recognize that the switch 122 and the WDM network elements 124 may be realized in the same network element. The photonic layer and the photonic control operating thereon can also include intermediate amplifiers and/or regenerators on the links 120 which are omitted for illustration purposes. The network 100 is illustrated, for example, as an interconnected mesh network, and those of ordinary skill in the art will recognize the network 100 can include other architectures, with additional sites 110 or with less node sites, with additional network elements and hardware, etc.

The sites 110 communicate with one another optically over the links 120. The sites 110 can be network elements which include a plurality of ingress and egress ports forming the links 120. Further, the sites 110, or nodes, can include various degrees (i.e., site 110c is a one-degree node, sites 110a, 110d are two-degree nodes, site 110e is a three-degree node, and site 110b is a four-degree node. The number of degrees is indicative of the number of adjacent nodes of each respective node. The network 100 includes a control plane 140 operating on and/or between the switches 122 at the sites 110a, 110b, 110c, 110d, 110e. The control plane 140 includes software, processes, algorithms, etc. that control configurable features of the network 100 (e.g., automating discovery of the switches 122, capacity of the links 120, port availability on the switches 122, connectivity between ports), dissemination of topology and bandwidth information between the switches 122, calculation and creation of paths for connections, network level protection and restoration, and the like. In one embodiment, the control plane 140 can utilize Automatically Switched Optical Network (ASON), Generalized Multiprotocol Label Switching (GM-PLS), Optical Signal and Routing Protocol (OSRP) (from Ciena Corporation), or the like. Those of ordinary skill in the art will recognize the network 100 and the control plane 140 can utilize any type of control plane 140 for controlling the switches 122 and establishing connections therebetween.

Service routing in the control plane 140 is generally known. A path (e.g., a subnetwork connection (SNC) or label switched path (LSP)) is considered valid for connection setup based on the availability of the switch 122, the links 120, and sufficient bandwidth available thereon. Photonic networks (e.g., Layer 0 and the wavelength interconnectivity of the WDM network elements 124) may introduce additional complexity of successfully setting up a service up. This can require that all Layer 0 services be pre-planned and/or managed manually. For example, potential paths for services at the photonic layer can be pre-planned by modeling them offline using a static snapshot of the network state to ensure that the computed paths are optically viable in terms of reach, nonlinear effects, dispersion, wavelength contention/blocking, etc. Here, the forecast tolerant engineering ensures that each wavelength placed into service will work in a worst case Optical Signal to Noise Ratio (OSNR) scenario, leading to potential excess margin.

The network 100 can include photonic control 150 which can be viewed any suitable implementation of a system acting as a control plane and/or control algorithm/loop for managing wavelengths from a physical perspective at Layer 0. In one aspect, the photonic control 150 is configured to add/remove wavelengths from the links in a controlled manner to minimize impacts to existing, in-service wavelengths. For example, the photonic control 150 can adjust modem launch powers, optical amplifier gain, variable optical attenuator (VOA) settings, wavelength selective switch (WSS) parameters, etc.

The network 100 can also include a Software Defined Networking (SDN) controller 160. SDN allows management of network services through abstraction of lower level functionality. This is done by decoupling the system that makes decisions about where traffic is sent (SDN control through the SDN controller 160) from the underlying systems that forward traffic to the selected destination (i.e., the physical equipment in the network 100). Work on SDN calls for the ability to centrally program provisioning of forwarding on the network 100 in order for more flexible and precise control over network resources to support new services. The SDN controller 160 is a processing device that has a global view of the network 100. Additionally, the SDN controller 160 can include or connect to SDN applications which can utilize the data from the SDN controller 160 for various purposes.

Figure 2:
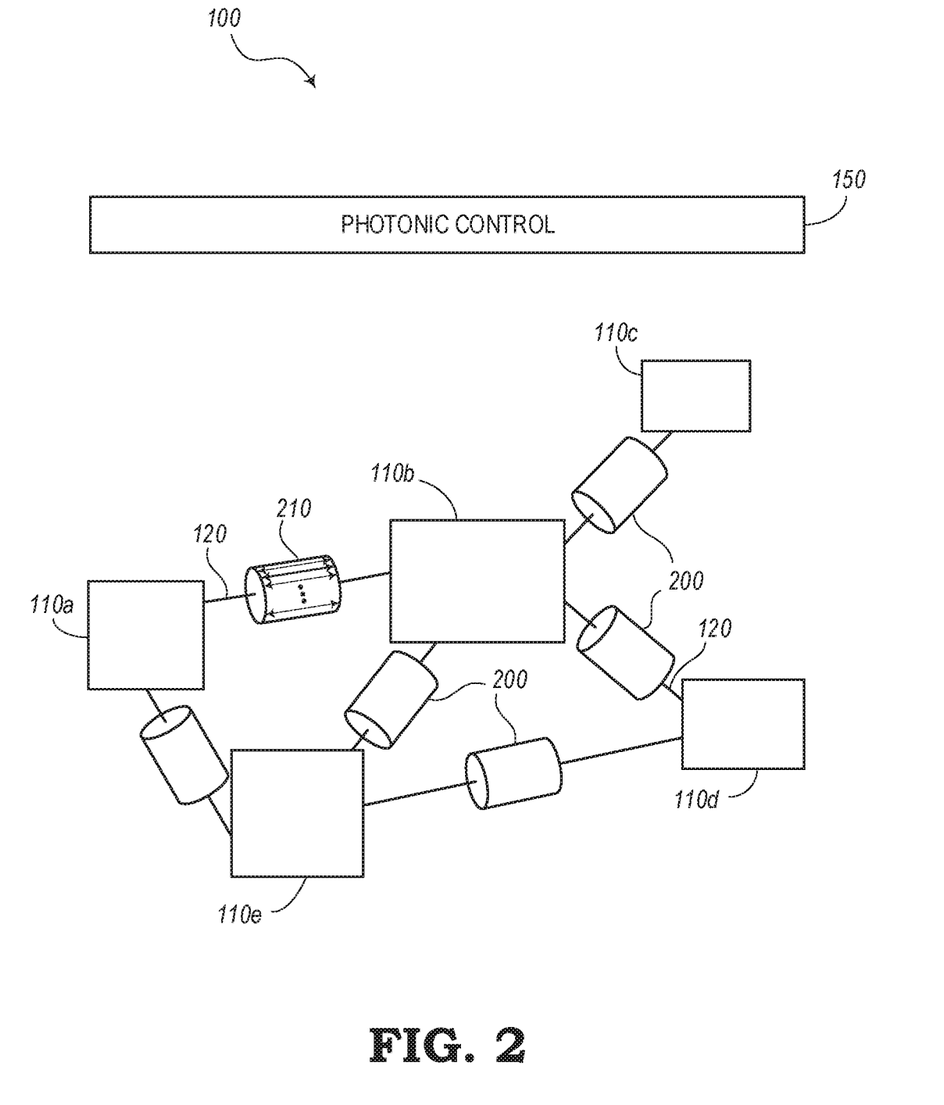
FIG. 2 is a diagram showing an embodiment of the network of FIG. 1 with the links logically shown carrying various wavelengths.

FIG. 2 is a diagram showing an embodiment of the network 100 of FIG. 1 with the links 120 logically shown carrying various wavelengths. The links 120 are shown with an optical fiber 200 which can include any type of optical fiber. For example, the optical fiber 200 can include a useable optical spectrum of about 1530 nm to 1565 nm (i.e., C-band) plus a useable optical spectrum of about 1565 nm to 1625 nm (i.e., L-band). Of course, other spectrums and bands are contemplated. The optical fiber 200 can be a flexible grid, a fixed grid, or a combination across the optical spectrum. Thus, each of the links 120 and their associated optical fiber 200 can support a fixed or variable number of wavelengths 210, which can also be referred to as optical signals. The wavelengths 210 traverse a channel which carries an underlying service between two of the sites 110 in the network. Each of the wavelengths 210 is formed by optical modems at two sites 110 where the channel is added/dropped (or regenerated). Since the network 100 is an interconnected mesh, the wavelengths 210 may be different on each of the links 120. Parameters associated with each of the wavelengths 210 can include an A-Z path in the network, spectrum allocation (e.g., fixed spectrum, flexible spectrum, amount of spectrum, location on the spectrum, etc.), modulation format, baud rate, FEC parameters, optical power, etc.

Figure 3:
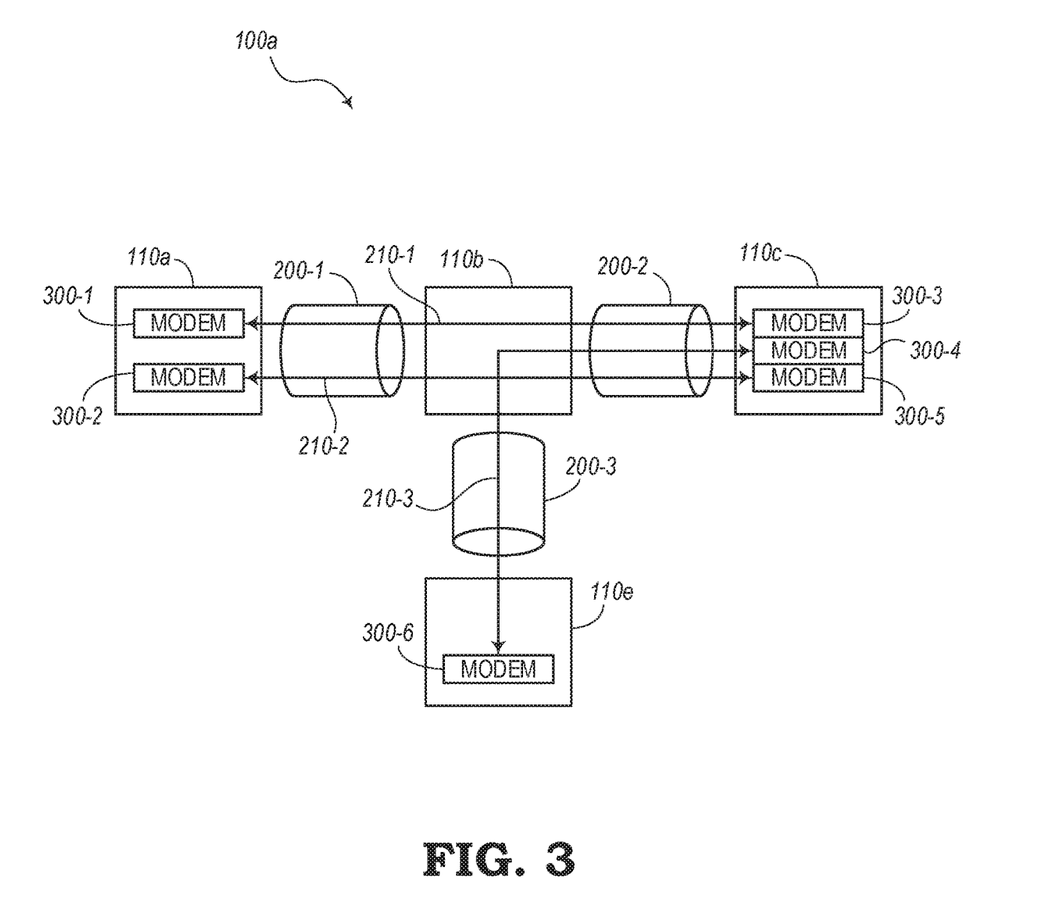
FIG. 3 is a diagram showing an embodiment of a subset of the network showing the sites and three exemplary wavelengths.

FIG. 3 is a diagram showing an embodiment of a subset 100a of the network 100 showing the sites 110a, 110b, 110c, 110e and three exemplary wavelengths 210-1, 210-2, 210-3. In the subset 100a, there is a fiber 200-1 connecting the sites 110a and 110b, a fiber 200-2 connecting the sites 110b and 110c, and a fiber 200-3 connecting the sites 110b and 110e. The wavelengths 210-1 and 210-2 are transmitted between the sites 110a and 110c and pass through the fibers 200-1 and 200-2 with an express-through at the site 110b. The wavelength 210-3 is transmitted between the sites 110e and 110c and pass through the fibers 200-3 and 200-2 with an express-through at the site 110b. The site 110a includes modems 300-1, 300-2, the site 110c includes modems 300-3, 300-4, 300-5, and the site 110e includes a modem 300-6. Thus, the wavelength 210-1 is formed by the modems 300-1 and 300-3, the wavelength 210-2 is formed by the modems 300-2 and 300-5, and the wavelength 210-3 is formed by the modems 300-6 and 300-4. The various wavelengths 210-1, 210-2, 210-3 can carry any type of traffic such as, without limitation, Optical Transport Network (OTN), SONET, SDH, Ethernet, Frame Relay, IP, MPLS, and the like, as well of combinations thereof.

Controller

Figure 4:
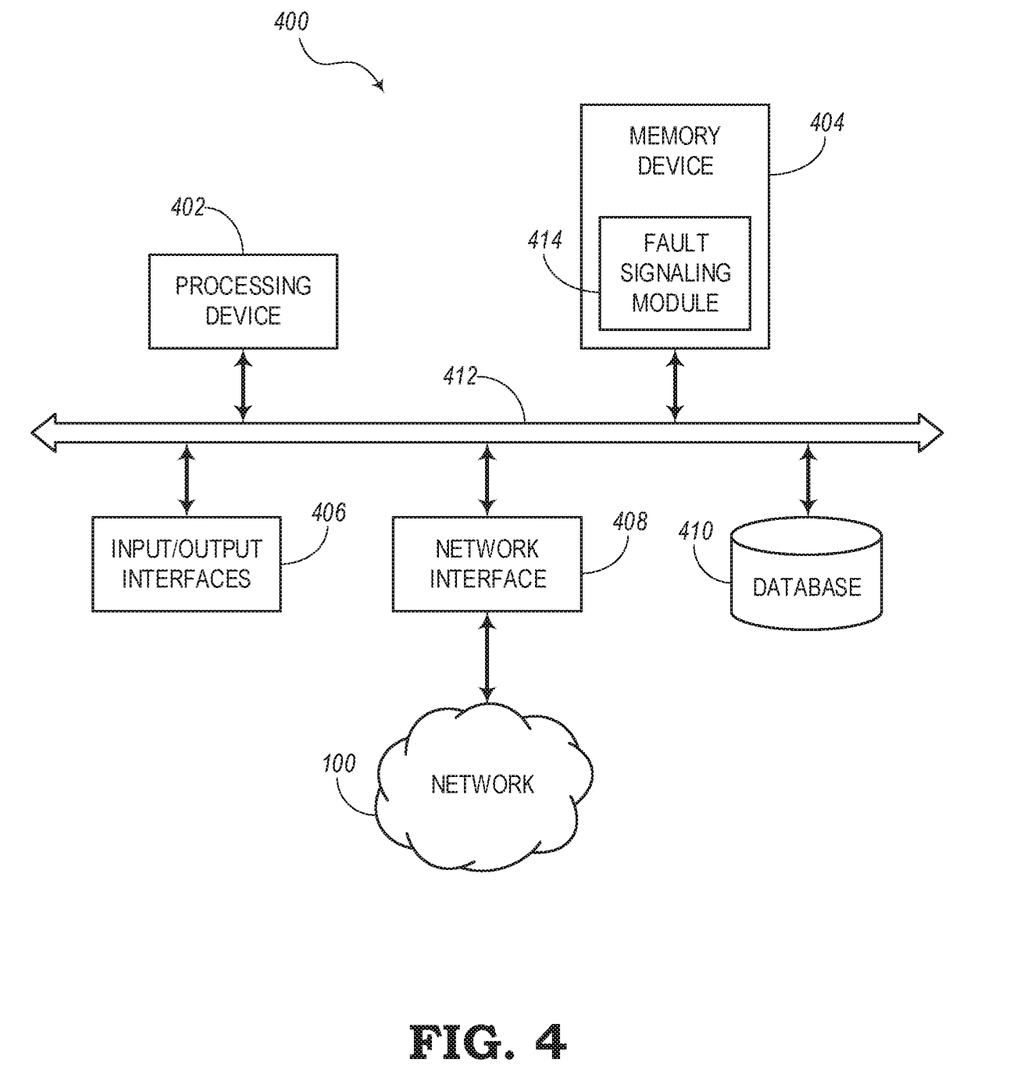
FIG. 4 is a block diagram of a controller for controlling the handling of fault signals in an optical system, according to various embodiments of the present disclosure.

FIG. 4 is a block diagram illustrating an embodiment of a controller 400 for handling faults within a network, such as the network 100 of FIG. 1. In the illustrated embodiment, the controller 400 may be a digital computer that, in terms of hardware architecture, generally includes a processing device 402, a memory device 404, Input/Output (I/O) interfaces 406, a network interface 408, and a database 410. The memory device 404 may include a data store, database (e.g., database 410), or the like. It should be appreciated by those of ordinary skill in the art that FIG. 4 depicts the controller 400 in a simplified manner, where practical embodiments may include additional components and suitably configured processing logic to support known or conventional operating features that are not described in detail herein. The components (i.e., 402, 404, 406, 408, 410) are communicatively coupled via a local interface 412. The local interface 412 may be, for example, but not limited to, one or more buses or other wired or wireless connections. The local interface 412 may have additional elements, which are omitted for simplicity, such as controllers, buffers, caches, drivers, repeaters, receivers, among other elements, to enable communications. Further, the local interface 412 may include address, control, and/or data connections to enable appropriate communications among the components 402, 404, 406, 408, 410.

The processing device 402 is a hardware device adapted for at least executing software instructions. The processing device 402 may be any custom made or commercially available processor, a Central Processing Unit (CPU), an auxiliary processor among several processors associated with the controller 400, a semiconductor-based microprocessor (in the form of a microchip or chip set), or generally any device for executing software instructions. When the controller 400 is in operation, the processing device 402 may be configured to execute software stored within the memory device 404, to communicate data to and from the memory device 404, and to generally control operations of the controller 400 pursuant to the software instructions.

It will be appreciated that some embodiments of the processing device 402 described herein may include one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), and the like). The processing device 402 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 406 may be used to receive user input from and/or for providing system output to one or more devices or components. User input may be provided via, for example, a keyboard, touchpad, a mouse, and/or other input receiving devices. The system output may be provided via a display device, monitor, Graphical User Interface (GUI), a printer, and/or other user output devices. I/O interfaces 406 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an Infra-Red (IR) interface, a Radio Frequency (RF) interface, and a Universal Serial Bus (USB) interface.

The network interface 408 may be used to enable the controller 400 to communicate over a network, such as the network 100, the Internet, a Wide Area Network (WAN), a Local Area Network (LAN), and the like. The network interface 408 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 408 may include address, control, and/or data connections to enable appropriate communications on the network 100.

The memory device 404 may include volatile memory elements (e.g., Random Access Memory (RAM)), such as Dynamic RAM (DRAM), Synchronous DRAM (SDRAM), Static RAM (SRAM), and the like, nonvolatile memory elements (e.g., Read Only Memory (ROM), hard drive, tape, Compact Disc ROM (CD-ROM), and the like), and combinations thereof. Moreover, the memory device 404 may incorporate electronic, magnetic, optical, and/or other types of storage media. The memory device 404 may have a distributed architecture, where various components are situated remotely from one another, but can be accessed by the processing device 402. The software in memory device 404 may include one or more software programs, each of which may include an ordered listing of executable instructions for implementing logical functions. The software in the memory device 404 may also include a suitable Operating System (O/S) and one or more computer programs, computer logic, code, etc. The 0/S essentially controls the execution of other computer programs, and provides scheduling, input-output control, file and data management, memory management, and communication control and related services. The computer programs may be configured to implement the various processes, algorithms, methods, techniques, etc. described herein.

The memory device 404 may include a data store used to store data. In one example, the data store may be located internal to the controller 400 and may include, for example, an internal hard drive connected to the local interface 412 in the controller 400. Additionally, in another embodiment, the data store may be located external to the controller 400 and may include, for example, an external hard drive connected to the Input/Output (I/O) interfaces 406 (e.g., SCSI or USB connection). In a further embodiment, the data store may be connected to the controller 400 through a network and may include, for example, a network attached file server.

Moreover, some embodiments may include a non-transitory computer-readable storage medium having computer readable code stored in the memory device 404 for programming the controller 400 or other processor-equipped computer, server, appliance, device, circuit, etc., to perform functions as described herein. Examples of such non-transitory computer-readable storage mediums include, but are not limited to, a hard disk, an optical storage device, a magnetic storage device, a Read Only Memory (ROM), a Programmable ROM (PROM), an Erasable PROM (EPROM), and Electrically Erasable PROM (EEPROM), Flash memory, and the like. When stored in the non-transitory computer-readable medium, software can include instructions executable by the processing device 402 that, in response to such execution, cause the processing device 402 to perform a set of operations, steps, methods, processes, algorithms, functions, techniques, etc. as described herein for the various embodiments.

The controller 400 may include a fault signaling module 414, which may be implemented in hardware, software, firmware, or any combination thereof. As shown, the fault signaling module 414 is configured as software or firmware and stored in the memory device 404. In other embodiments, the fault signaling module 414 may be at least partially implemented as hardware in the processing device 402. The fault signaling module 414 may include instructions, code, logic, etc. configured to enable the processing device 402 to perform various functions when a fault is detected in a multi-band optical network.

As such, the processing device 402, according to the instructions of the fault signaling module 414, may be configured to detect when a fault is present on at least one of the bands of the multi-band network. In response to a fault being present, the processing device 402 may be configured to determine which band or bands that are affected by the detected fault. In some cases, it may be determined that only one band (e.g., the C-band) of a multi-band network (e.g., C+L band system) is affected by the fault. In the case where a fault only affects one band, the processing device 402 may be configured to create a fault signal that can be communicated with respect to this band. Then, the processing device 402 may convey this fault signal via a control plane to an upstream and/or downstream controller associated with the affected band to instruct the upstream/downstream controllers to handle the fault as appropriate for the affected band. Handling the fault may include triggering some action in a component within the affected band. It should be noted that the fault signal is dedicated to only one band and is sent to the downstream component regardless of what is happening on the other band or bands in the multi-band system.

Per-Band Fault Signaling

The present disclosure focuses on generating per-band fault signaling in a multi-band transmission system (e.g., a C+L band optical network), where each band can be controlled with its own set of actuators. For example, the actuators may be configured to perform certain actions (e.g., amplification, attenuation, directional control, etc.) on a component affected by the fault in the respective band. One objective of per-band fault signaling methods of the present disclosure may be to generate a fault indication for a given transmission band, when that spectrum band gets faulted, where the given band can contain traffic channels, channelized ASE sources, or a combination of both.

Figure 5:
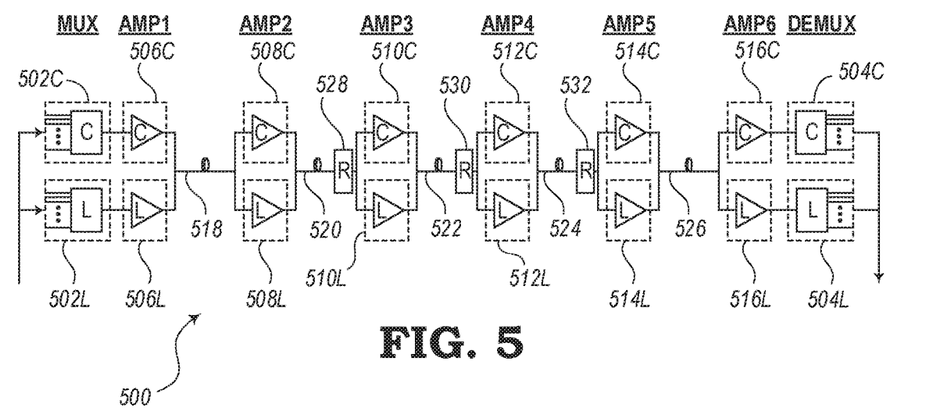
FIG. 5 is a schematic diagram of a photonic line system according to various embodiments of the present disclosure.

FIG. 5 is a schematic diagram showing an embodiment of a photonic line system 500 for carrying both C-band and L-band optical signals. As shown in this embodiment, the photonic line system 500 includes a multiplexer stage 502 at a west degree, which includes a C-band multiplexer 502C and an L-band multiplexer 502L, and a demultiplexer stage 504 at an east degree, which includes a C-band demultiplexer 504C and an L-band demultiplexer 504L. The multiplexer stage 502 is configured to multiplex both C-band and L-band signals independently and the demultiplexer stage 504 is configured to demultiplex both the C-band and L-band signals independently. Also, six amplifier (AMP) stages 506, 508, 510, 512, 514, and 516 are shown, where AMP1 506 includes a C-band amp 506C and an L-band amp 506L, AMP2 508 includes a C-band amp 508C and an L-band amp 508L, AMP3 510 includes a C-band amp 510C and an L-band amp 510L, AMP4 512 includes a C-band amp 512C and an L-band amp 512L, AMP5 514 includes a C-band amp 514C and an L-band amp 514L, and AMP6 516 includes a C-band amp 516C and an L-band amp 516L. The AMP5 506, 508, 510, 512, 514, and 516 are arranged between the multiplexers 502 and demultiplexers 504 and are configured for amplifying C-band and L-band signals independently across five fiber lines 518, 520, 522, 524, and 526. In this embodiment, the photonic line system 500 further includes Raman amplifiers 528, 530, and 532 positioned at an input to the amplifiers AMP3, AMP4, and AMP5, respectively.

The photonic line system 500 is configured to carry both C-band and L-band optical signals, where each band of optical signals is amplified and controlled using band-specific multiplexers 502, optical amplifiers 506, 508, 510, 512, 514, 516, and demultiplexers 504, respectively. When the photonic line system 500 is put into use, an assumption can be made that traffic (i.e., optical signals) are present in both bands and the photonic line system 500 is in an optimized condition or is calibrated in either a full-fill or partial spectral loading condition.

Sensing devices (not shown), which may be implemented in a control plane, are configured to detect when a fault occurs in the photonic line system 500. For example, some faults may be localized such that they only affect one band (e.g., the C-band) while having no affect (or little affect) on the other band (e.g., the L-band). Thus, some faults may only affect one of the spectrum bands. Each of the various stages 502, 504, 506, 508, 510, 512, 514, 516 may include corresponding controllers for each band to enable actions to be taken in response to a detected fault. These controllers may be downstream controllers for handling FDIs and/or upstream controllers for handling RDIs. Those skilled in the art will appreciate fault detection is well known and all such techniques are contemplated herein.

The fault might be introduced in a variety of ways and can affect any given span. For example, a first kind of fault on a single band may include a failure on a band-specific amplifier or on a band-specific multiplexer, a failure on a switching element (e.g., a WSS failure, Circuit Pack (CP) failure, CP removal, etc.), or if there is an administrative shutdown on one of the active components. A second kind of fault on a single band may include a partial band-spectrum failure (e.g., a band-specific Erbium-Doped Fiber Amplifier (EDFA) pump failure, a pump failure in a Raman amplifier, etc.). A third kind of fault on a single band may include a pulling (removal), either accidental or intentional, of a fiber that carries a specific band of spectrum (e.g., a C-band multiplexer to C-band amplifier connection). A fourth kind of fault on a single band may include a pinch on a fiber affecting only a specific band in the spectrum.

Of note, the photonic line system 500 includes the fiber lines 518, 520, 522, 524, and 526 which are physical fibers connecting the network elements. However, the various equipment for the separate bands (e.g., the C-band and the L-band) is separate. The different equipment for the C-band and the L-band can be part of the same network element, but is typically separate hardware, circuit packs, modules, etc., such that spectrum for a specific band can be controlled using band-specific mux/demux and gain/loss actuators in the line system, and a failure of equipment may only affect one of the bands. The present disclosure leverages this aspect to ensure that a fault affecting a single band does not impact the operation of the other surviving band(s).

Figure 6:
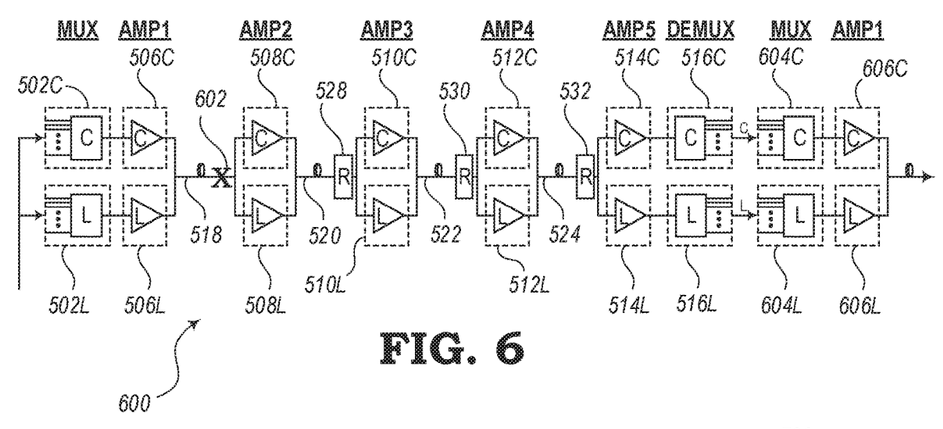
FIG. 6 is a schematic diagram of another photonic line system illustrating a line fault, according to various embodiments.

FIG. 6 is a schematic diagram illustrating another embodiment of a photonic line system 600 of a section of an optical network. In this embodiment, the photonic line system 600 is shown with a detected fault 602, such as a common line fault. The photonic line system 600 includes many of the same elements as the photonic line system 500 of FIG. 5. In addition, the photonic line system 600 has another a multiplexer stage 604, which includes a C-band multiplexer 604C and an L-band multiplexer 604L, and an amplifier stage 606, which includes a C-band amplifier 606C and an L-band amplifier 606L. The photonic line system 600 may be referred to as an ASE loaded system.

In an ASE loaded system of a multi-band transmission network (e.g., photonic lines system 600) having the presence of Raman amplifiers (e.g., Raman amplifiers 528, 530, 532), conditions in the system may be prone to suffer more greatly when a fault (e.g., detected fault 602) is present. For example, in such a configuration, the detected fault 602 (e.g., common line-fault or band-specific fiber fault) does not translate into a Loss of Signal (LOS) for channels going into a downstream section due to Stimulated Raman Scattering (SRS) and tilt, and the ASE replacement mechanism, which may normally be considered to be a core feature of an ASE loaded system and relies on channel LOS detection, fails.

With the detected fault 602 in such a configuration, only the amplifiers on both sides of the faulted span (i.e., AMP1 and AMP2) get shut down to ensure laser safety for fiber maintenance. A downstream controller associated with the AMP2 508 may be configured to shut down an amplifier (e.g., 508C, 508L) corresponding to a specific faulted band or may shut down a pre-amplifier of a downstream component. In an EDFA only system, EDFAs downstream of the detected fault 602 get shut down due to loss of light. In a Raman amplified system, the downstream Raman amplifiers 528, 530, 532 (or pre-amplifiers) do not get shut down due to an upstream fiber fault (e.g., detected fault 602), which can generate enough ASE for all transmission bands that the downstream EDFAs may not go into a shutoff state. In such case, if the downstream section multiplexer 604 relies on channel power to go into Loss of Signal (LOS) or below a certain threshold to trigger an ASE replacement, not every channels or every spectrum-band would detect a clear LOS condition, and hence will not switch to ASE.

Similarly, if there is a band-specific fault (e.g., a fiber pull between the L-band multiplexer 502L and the L-band post amplifier 506L), then, due to the presence of Raman amplification and line SRS, the downstream section multiplexer 604L may not detect LOS for faulted band-spectrum, and hence, the trigger to ASE replacement fails. This means that in a multi-band transmission system, a mechanism is required that will shut down all per-band actuators at the trigger of band-specific or common faults to ensure that lights are not transmitting to a downstream degree in order to trigger a clear LOS detection and ASE replacement at downstream section mux.

Due to these reasons, the embodiments of FIGS. 5 and 6 may generate a common fault indication (irrespective of bands) for the detected fault 602 (e.g., common line fault, line fiber cut, etc.), but may not be able to handle the fault as needed to optimize the optical system. As mentioned below, a preferred embodiment may remediate these issues by handling a section-wide notification for a specific band failure that requires attention.

Figure 7:
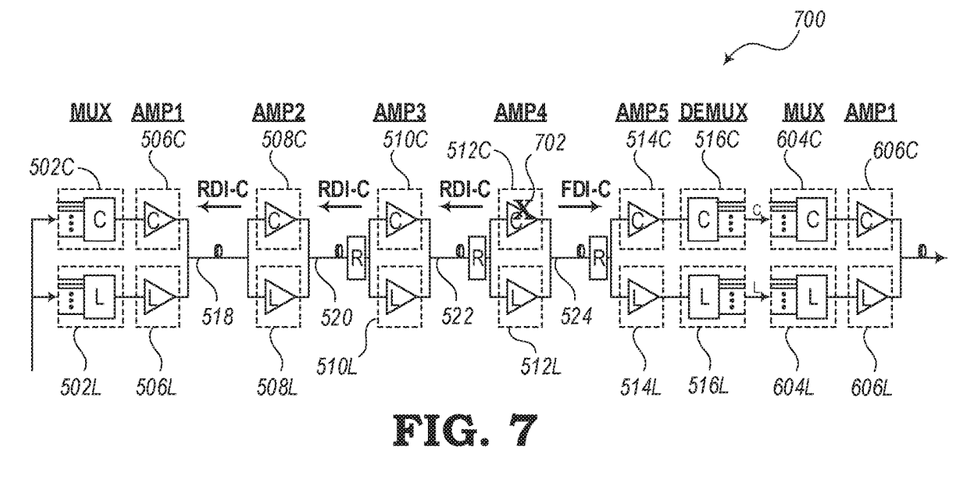
FIG. 7 is a schematic diagram of the photonic line system of FIG. 6 illustrating fault signaling that may be conducted per band, according to various embodiments.

FIG. 7 is a schematic diagram illustrating the photonic line system 600 of FIG. 6 and demonstrates strategic methods of fault signaling that may be conducted per band. The fault signaling module 414 shown in FIG. 4 may be used with the photonic line system 600 for handling faults according to various embodiments of the present disclosure. Also, the process described below with respect to FIG. 8 may be implemented by the fault signaling module 414 for handling any detected faults in an optical system (e.g., photonic line system 600) as mentioned with respect to preferred embodiments.

One preferred process may include detecting band-specific faults on a node and generating band-specific fault indicators. These band-specific fault indicators can be conveyed to other components in the node by traversing the indicators both upstream and downstream of a section. The fault indicators are configured to notify the controllers associated with the other components about the fault condition so that the dependent controllers (e.g., local and/or sectional controllers), either upstream or downstream of the detected fault, can take necessary actions on one or more in-band components. For example, the controllers may be configured to perform certain functions, such as replacing a faulted band with ASE. In addition, according to some embodiments of the preferred methods, the control systems may serve a key notification to a Layer 0 control plane to enable a band-specific link-down or link-block condition, where only a specific faulted band will be restored (or blocked) in a section to avoid future restoration, independently of what may be happening on the other band (or bands). Generally, the processes for signaling faults may be applicable for any system carrying multiple bands (e.g., C-band, L-band, Optical Supervisory Channel (OSC) communication band, etc.). However, other potential use cases may include operation of the fault signaling processes in a network-wide alarm correlation to suppress band-specific alarms in downstream nodes for band-specific failures in an upstream device or in other environments as will be understood by one of skill in the pertinent arts.

Therefore, the per-band signaling as described in the various embodiments of the present disclosure may be implemented in a multi-band system, where each band is optically controlled by its own dedicated optical actuators. If a fault occurs, which happens to completely or partially impact a given frequency band, then the processes described herein may be configured to generate per-band fault signaling from the node where the fault is detected. An associated controller (e.g., controller 400 of FIG. 4) may be configured to traverse per-band fault signals indicative of the characteristics of fault to a section-tail at downstream portion of the photonic line system and to a section-head at upstream portion of the photonic line system. In response, the dependent controllers may be configured to mark the spectrum for which fault notification is received as "faulted." Actions for correcting the fault may be performed on the in-band components affected by the fault in the corresponding band.

As shown as an example in FIG. 7, a fault 702 is detected (e.g., by any suitable detecting devices) that impacts the C-band amplifier 512C of AMP4 512. Fault signaling is then communicating upstream and downstream to instruct other related controllers to handle the fault as needed with regard to the C-band only. According to the embodiments of the present disclosure, the instructions for handling the fault on the C-band may have no impact (or little impact) on how the L-band will operate. In other words, the L-band will be controlled independently of what is happening in the C-band. Also, it should be noted that the reverse is applicable, whereby any fault signaling with respect to the L-band will have little or no impact on how the controllers control the C-band but instead is handled regardless of conditions in the L-band. The independent indication of faults on the different bands may be referred to as "per-band" fault indication.

Per-band fault indicators may include one or more Forward Defect Indicators (FDIs) and/or one or more Reverse Defect Indicators (RDIs), as shown in FIG. 7. As the names suggest, the FDIs are communicated in a forward direction (i.e., where signals are traversed from left to right as shown on the page) and RDIs are communicated in a reverse direction (i.e., right to left). The per-band fault indicators may also be dedicated to one particular band (X), whereby FDI-X-band and RDI-X-band signals are generated solely based on fault detected on that band (X) irrespective of the presence of other spectrum bands. Again, according to a C+L-band system carrying C-band and L-band signals, X may represent either the C-band, L-band, or an OSC-band. For a common-line fault (e.g., fault 602) that impacts all spectrum-bands on the line-system, a line-system fault indicator can be generated which can be an AND condition of all per-band fault indicators.

When a per-band fault indicator is raised, a per-band actuator (e.g. amplifier, WSS, etc.) may be closed, at least at the section-tail, to ensure light does not propagate to a downstream multiplexer (e.g., multiplexer 604) in order to ensure ASE replacement taking place in downstream mux for the given band in an ASE loaded system. The per-band actuator at a section mux also switches to ASE for the faulted band, even though the line is already faulted in downstream, in order to reduce additional penalty on other surviving bands. Typically, in a full-fill ASE loaded link, if a spectrum band fails in one direction due to fiber fault, Automatic Power Reduction (APR) can be activated on the reverse direction in order to reduce maintenance exposure below a 1M safety limit, which may impact other co-propagating bands. Switching to ASE at a head-end, based on band fault notification, minimizes the impact on neighboring surviving bands. Per band fault signaling allows dependent controllers within a section and outside of the section along the channel path to react only for the affected or faulted bands and not penalizing traffic in other surviving spectrum bands.

Example Use Cases and Advantages

If a fault indication for C-band is raised (e.g., FDI-C-band and/or RDI-C-band), the control plane 140 may be configured to only consider a link down for C-band traffic only. This means that only C-band channels get restored, while restoration for L-band channels depends on their own available margin. For future restoration activity, the control plane 140 can also keep the C-band spectrum blocking, while L-band spectrum for the same line system may be allowed for restoration. In an ASE loaded system, based on per-band fault notification from upstream, the actuator for the dependent downstream section multiplexer can switch just the C-band channels to ASE, while the surviving L-band channels may still point to an upstream section. A local section head actuator can switch just the C-band spectrum to ASE, even though the line may already be faulted in a downstream component.

Similarly, if FDI-L-band or RDI-L-band is raised, then similar control actions can be taken for L-band traffic only, while C-band traffic may remain un-impacted. The band-specific FDIs can be used for alarm correlation to mask downstream band-specific alarms. If the supervisory communication is faulted on a span, the FDI-OSC and/or RDI-OSC signals can be conveyed over the section via a control plane of the multi-band communication system to notify any controllers within the OMS that the end-to-end section level control running over the in-band OSC (e.g., sectional optimization or pinch compensation) is compromised. The corresponding controller may use this notification to trigger an action for handling the fault.

Figure 8:
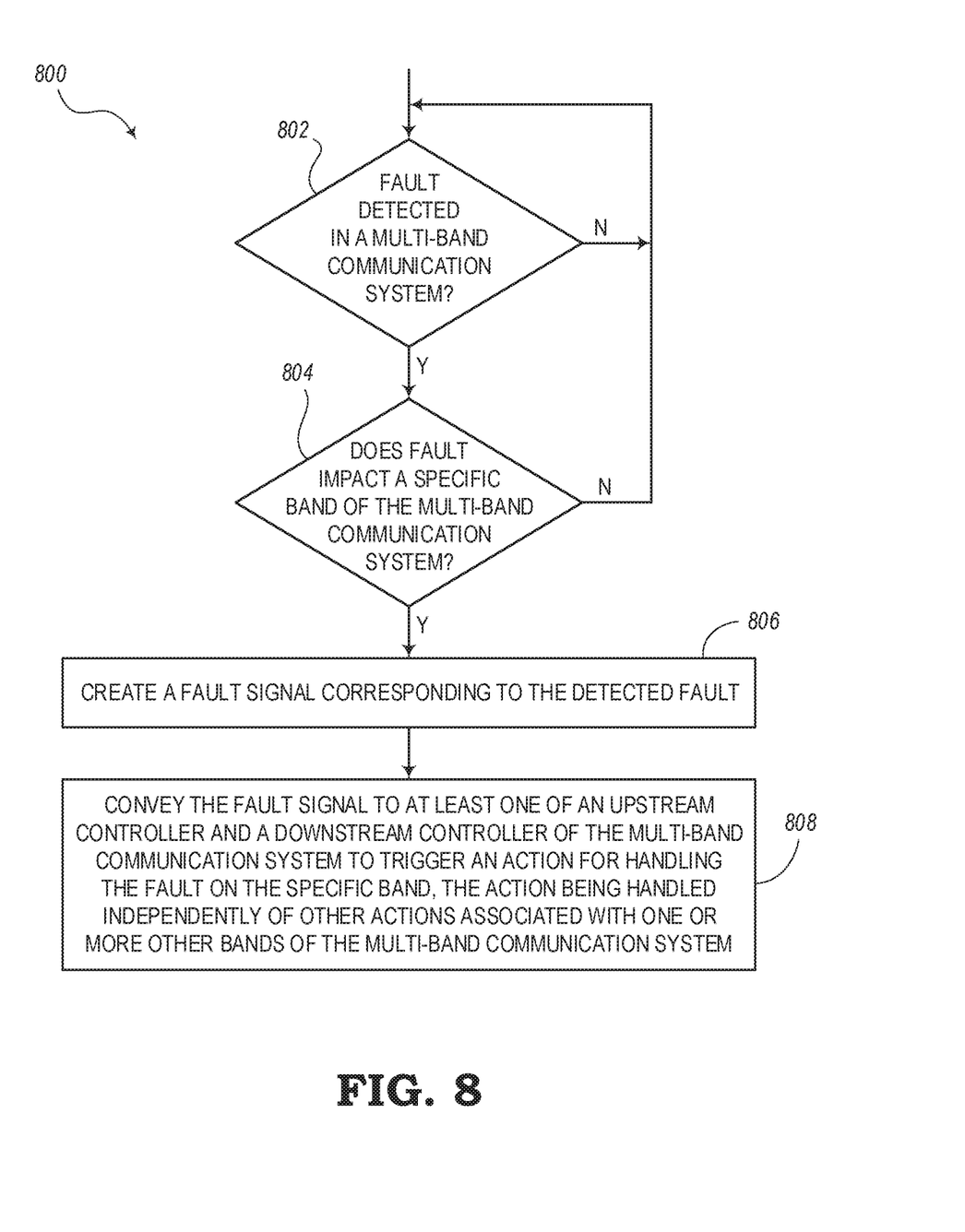
FIG. 8 is a flow diagram illustrating a process for handling fault signals in an optical system, according to various embodiments of the present disclosure.

FIG. 8 is a flow diagram illustrating a process 800 for handling fault signals in an optical system or other multi-band communication system. Particularly, the process 800 may be associated with one band for handling faults that occur in that one band. The same or similar processes may be implemented for the one or more other respective bands of the multi-band communication system, whereby each band handles faults within that respective band regardless of what is happening in the other bands. Thus, each band is processed independently irrespective of the other bands. The process 800 may be implemented by a controller (e.g., controller 400) of a multi-band communication system according to some embodiments and may be configured as software or firmware (e.g., fault signaling module 414) stored in non-transitory computer-readable media (e.g., memory device 404) for enabling one or more processors (e.g., processing device 402) to perform certain functions.

In the embodiment shown in FIG. 8, the process 800 includes a step of determining if a fault has been detected in a multi-band communication system, as indicated in decision block 802. If not, the process 800 loops back until a fault is detected. When a fault is detected, the process 800 proceeds to decision block 804, which indicates the step of determining if the detected fault has an impact on a specific band of the multi-band communication system. If the fault does not impact the specific band, the process 800 returns back to decision block 802 to detect other faults that may impact the specific band. If the fault does impact the specific band, the process 800 proceeds to block 806.

In response to a detected fault in the multi-band communication system impacting a specific band of the multi-band communication system, the process 800 is configured to create a fault signal corresponding to the detected fault, as indicated in block 806. The process 800 also includes the step of conveying the fault signal (via a control plane) to at least one of an upstream controller and a downstream controller of the multi-band communication system to trigger an action for handling the fault on the specific band, as indicated in block 808. The action can be handled independently of other actions associated with one or more other bands of the multi-band communication system. It should be noted that the handling of the fault on the specific band, as described with respect to block 808, does not necessarily affect operations on the one or more other bands.

In some embodiments, the fault signal may be configured to trigger the downstream controller to execute an action of replacing the specific band with Amplified Spontaneous Emission (ASE) in a downstream section-multiplexer. The fault signal may be configured to trigger replacement of the specific band with ASE in the downstream section-multiplexer by instructing the downstream controller to shut down at least the last amplifier corresponding to the specific band within a local Optical Multiplex Section (OMS). The fault signal may be configured to trigger replacement of the specific band with ASE in the downstream section-multiplexer by instructing the downstream controller to send the fault signal to one or more further downstream controllers. Also, the fault signal may be conveyed to the downstream controller for alarm correlation by causing the downstream controller to suppress alarms corresponding the detected fault in the specific band. In some embodiments, the fault signal described in the process 800 may be configured to trigger a downstream controller to execute an action of blocking spectrum from Layer 0 Control Plane (L0CP) restoration.

The fault signal may be configured to trigger the upstream controller to execute an action of replacing the specific band with Amplified Spontaneous Emission (ASE) in an upstream section-multiplexer. Also, the fault signal may be configured to trigger the upstream controller and the downstream controller to execute actions to block spectrum from Layer 0 Control Plane (L0CP) restoration.

The fault signal may be an Optical Supervisory Channel (OSC) fault signal and may be configured to trigger the upstream controller and the downstream controller to execute actions to avoid sections of the multi-band communication system for Layer 0 Control Plane (L0CP) restoration. In general, fault indication may be generated for supervisory communication, which means that L0CP, which relies on OSC for all of its in-band communication, will be impacted in the future to trigger a Layer 0 restoration over that section. Thus, the system can be configured for L0CP to avoid those sections to consider for future restoration. If L0CP has a redundant communications path, then it can ignore that fault indication against supervisory communication and still can consider the OMS for future restoration.

The multi-band communication system may be an optical system configured to carry C-band and L-band optical signals or alternatively may be any suitable multi-band system or network. As an optical system, an affected component may include one or more downstream optical components and/or one or more upstream optical components. The upstream controller and the downstream controller may be configured to handle the detected fault with respect to an upstream optical component and a downstream optical component. The C-band and L-band spectrum may be controlled using band specific gain/loss actuators and multiplexer/demultiplexer actuators.

Therefore, according to the embodiments of the system and methods described in the present disclosure, mechanisms are provided herein to convey per-band notifications of faults to upstream and/or downstream dependent controllers, as well as to a Layer 0 Control Plane (L0CP). This can be done without convicting the full spectrum or other surviving bands. Thus, the present disclosure provides a simplified approach to convict a given band in a spectrum without the full-scale modelling of all internal and external component ports along the section or channel path. The preferred embodiments herein provide a generic implementation for use in multi-band transmission systems that works for both with and without ASE loading system.

The embodiments may be employed in an optical system offering C+L as a multi-band transmission system as part of a Reconfigurable Line System (RLS) solution for providing per-band processing of faults. This may allow RLS systems to handle band-specific failures and/or fault notifications. According to the preferred embodiments, the systems and methods described herein may enhance existing RLS systems to allow the handling of band-specific failures, which may be able to guarantee ASE replacements in downstream sections when an upstream band-specific fault takes place. Since it is normally a requirement for ASE loaded system to restore traffic at a fault, the systems and methods of the present disclosure may be employed to ensure the restoration of traffic when made aware of a fault in the system. The present embodiments may offer a solution for L0CP systems on C-band+L-band optical line networks.

The systems and methods described in the present disclosure may be configured to represent C-band, L-band, and C+L-band failures as separate but hierarchical, where they may also be handled separately within an Optical Multiplex Section (OMS) of an Optical Transport System (OTS). This may be referred to as sub-OMS, which may include fault isolation and signaling for a given band, rather than actually controlling that band. However, the concepts described herein may be extended to more than just C+L-band communication system applications. For instance, for submarine Branching Unit (BU) applications, geographically diverse domain terminations can be modelled logically as sub-OMS.

The present disclosure is effectively directed to per-band fault signaling, where the band can be logically identified or can be constrained by hardware. For example, the embodiments may be deployed for section-wide fault signaling for identifying a fault in a supervisory band, or specifically on C-band or L-band components. In other embodiments, fault signaling may be deployed in any given band where that band is spectrally controlled by separate controllers independent of other bands.

One of the benefits or advantages of the embodiments of the present disclosure includes providing a C+L ASE loaded system in a new line system, whereby ASE replacement on channel fault can work properly with the present embodiments in a C+L ASE loaded system with Raman amplified links. Employment of these systems may be advantageous, particularly since L0CP on C+L-band systems is relatively new. The methods generate per-band fault handling for C-band, L-band, or OSC, and can notify and OMS and control plane for the band fault. The control plane may execute specific actions for each band fault. It is believed that isolating faults on supervisory bands is not a part of conventional systems. This may be important in L0CP since it uses mostly in-band communications over OSC.

It should be noted that per-band fault handling is not be confused with per-channel fault handling. Generating, a per-channel fault cannot solve atomic band failures in Raman links or in a control plane. Thus, one objective with the present embodiments is to generate per-band fault signaling where each band can be controlled with band-specific optical components (e.g., OSC, C-band, or L-band equipment, which may be different from each other). All bands may be configured as co-propagating within the same transmission link.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A controller of a multi-band communication system, the controller comprising
   a processing device, and
   a memory device configured to store computer logic having instructions that, when executed, enable the processing device to
   perform Layer 0 (L0) management via a L0 Control Plane (L0CP) of the multi-band communication system,
   in response to a detected fault in the multi-band communication system impacting only a specific band of the multi-band communication system, create a fault signal corresponding to the detected fault, wherein the L0CP treats each band of the multi-band communication system independently in terms of L0CP actions, and
   convey the fault signal to at least one of an upstream controller and a downstream controller of the multi-band communication system to trigger an action associated with the L0CP for handling the detected fault only on the specific band, wherein the action is replacing the specific band with Amplified Spontaneous Emission (ASE), independently of any other bands of the multi-band communication system, wherein the fault signal is specific to the specific band so that the L0CP marks the specific band as faulted to block the specific band from any capacity operations and to mask any alarms downstream for the specific band.

2. The controller of claim 1, wherein the detected fault is a failure of the specific band, the action for handling the detected fault on the specific band is restoration of all channels on the specific band such that any channels on the one or more other bands remain unaffected.

3. The controller of claim 1, wherein the fault signal is configured to trigger the downstream controller to execute the replacing the specific band with the ASE in a downstream section-multiplexer.

4. The controller of claim 3, wherein the fault signal is configured to trigger replacement of the specific band with ASE in the downstream section-multiplexer by instructing the downstream controller to shut down at least a last amplifier corresponding to the specific band within a local Optical Multiplex Section (OMS).

5. The controller of claim 3, wherein the fault signal is configured to trigger replacement of the specific band with ASE in the downstream section-multiplexer by instructing the downstream controller to send the fault signal to one or more further downstream controllers.

6. The controller of claim 1, wherein the fault signal is conveyed to the downstream controller for alarm correlation by causing the downstream controller to suppress alarms corresponding the detected fault in the specific band.

7. The controller of claim 1, wherein the fault signal is configured to trigger the upstream controller, relative to the fault, to execute the replacing the specific band with the ASE in an upstream section-multiplexer.

8. The controller of claim 1, wherein the fault signal is configured to trigger the upstream controller and the downstream controller to execute actions to block spectrum from Layer 0 Control Plane (L0CP) restoration.

9. The controller of claim 1, wherein the fault signal is an Optical Supervisory Channel (OSC) fault signal and is configured to trigger the upstream controller and the downstream controller to execute actions to avoid sections of the multi-band communication system for Layer 0 Control Plane (L0CP) restoration.

10. The controller of claim 1, wherein the multi-band communication system is an optical system configured to carry C-band and L-band optical signals, and wherein the upstream controller and the downstream controller are configured to handle the detected fault with respect to an upstream optical component and a downstream optical component.

11. The controller of claim 10, wherein C-band and L-band spectrum is controlled using band specific gain/loss actuators and multiplexer/demultiplexer actuators.

12. The controller of claim 1, wherein the L0CP marks links down on a per band basis based on the fault signal.

13. A non-transitory computer-readable medium configured to store a computer program having instructions that, when executed, enable one or more processing devices to
perform Layer 0 (L0) management via a L0 Control Plane (L0CP) of a multi-band communication system,
in response to a detected fault in the multi-band communication system impacting only a specific band of the multi-band communication system, create a fault signal corresponding to the detected fault, wherein the L0CP treats each band of the multi-band communication system independently in terms of L0CP actions, and
convey the fault signal to at least one of an upstream controller and a downstream controller of the multi-band communication system to trigger an action associated with the L0CP for handling the detected fault only on the specific band, wherein the action is replacing the specific band with Amplified Spontaneous Emission (ASE), independently of any other bands of the multi-band communication system, wherein the fault signal is specific to the specific band so that the L0CP marks the specific band as faulted to block the specific band from any capacity operations and to mask any alarms downstream for the specific band.

14. The non-transitory computer-readable medium of claim 13, wherein the fault signal is configured to trigger the downstream controller to replace the specific band with Amplified Spontaneous Emission (ASE) in a downstream section-multiplexer by causing the downstream controller to execute one or more of:
shutting down at least a last amplifier corresponding to the specific band within a local Optical Multiplex Section (OMS), and
sending the fault signal to one or more further downstream controllers.

15. A method comprising the steps of
performing Layer 0 (L0) management via a L0 Control Plane (L0CP) of a multi-band communication system,
in response to a detected fault in the multi-band communication system impacting only a specific band of the multi-band communication system, creating a fault signal corresponding to the detected fault, wherein the L0CP treats each band of the multi-band communication system independently in terms of L0CP actions, and
conveying the fault signal to at least one of an upstream controller and a downstream controller of the multi-band communication system to trigger an action associated with the L0CP for handling the detected fault only on the specific band, wherein the action is replacing the specific band with Amplified Spontaneous Emission (ASE), independently of any other bands of the multi-band communication system, wherein the fault signal is specific to the specific band so that the L0CP marks the specific band as faulted to block the specific band from any capacity operations and to mask any alarms downstream for the specific band.

16. The method of claim 15, wherein the detected fault is a failure of the specific band, the action for handling the detected fault on the specific band is restoration of all channels on the specific band such that any channels on the one or more other bands remain unaffected.

17. The method of claim 15, wherein the fault signal is configured to trigger the downstream controller to execute the replacing the specific band with the ASE in a downstream section-multiplexer, and wherein the fault signal is configured to trigger replacement of the specific band with ASE in the downstream section-multiplexer by instructing the downstream controller to execute one of:
shutting down at least a last amplifier corresponding to the specific band within a local Optical Multiplex Section (OMS), and
sending the fault signal to one or more further downstream controllers.

18. The method of claim 15, further comprising the step of conveying the fault signal to the downstream controller to cause the downstream controller to suppress alarms corresponding the detected fault in the specific band.

19. The method of claim 15, wherein the fault signal is configured to trigger the upstream controller, relative to the fault, to execute the replacing the specific band with the ASE in an upstream section-multiplexer.

20. The method of claim 15, wherein the fault signal is configured to trigger a downstream controller to execute an action of blocking spectrum from Layer 0 Control Plane (L0CP) restoration.

* * * * *